Sept. 5, 1961

J. G. GIEVERS 2,998,746

ANGULAR MEASUREMENT SYSTEM

Filed Oct. 13, 1959

3 Sheets-Sheet 1

John G. Gievers
INVENTOR.

BY

Sept. 5, 1961 J. G. GIEVERS 2,998,746
ANGULAR MEASUREMENT SYSTEM
Filed Oct. 13, 1959 3 Sheets-Sheet 2

John G. Gievers
INVENTOR.
BY

John G. Gievers
INVENTOR.

United States Patent Office 2,998,746
Patented Sept. 5, 1961

2,998,746
ANGULAR MEASUREMENT SYSTEM
John George Gievers, Rochester, Mich., assignor to the United States of America as represented by the Secretary of the Army
Filed Oct. 13, 1959, Ser. No. 846,218
9 Claims. (Cl. 88—14)

This invention relates to devices for angular measurements and particularly to means of indicating angular differences in orientation utilizing polarized light.

It is the object of this invention to provide an improved system of angular measurement capable of extreme accuracy.

Figure 1:
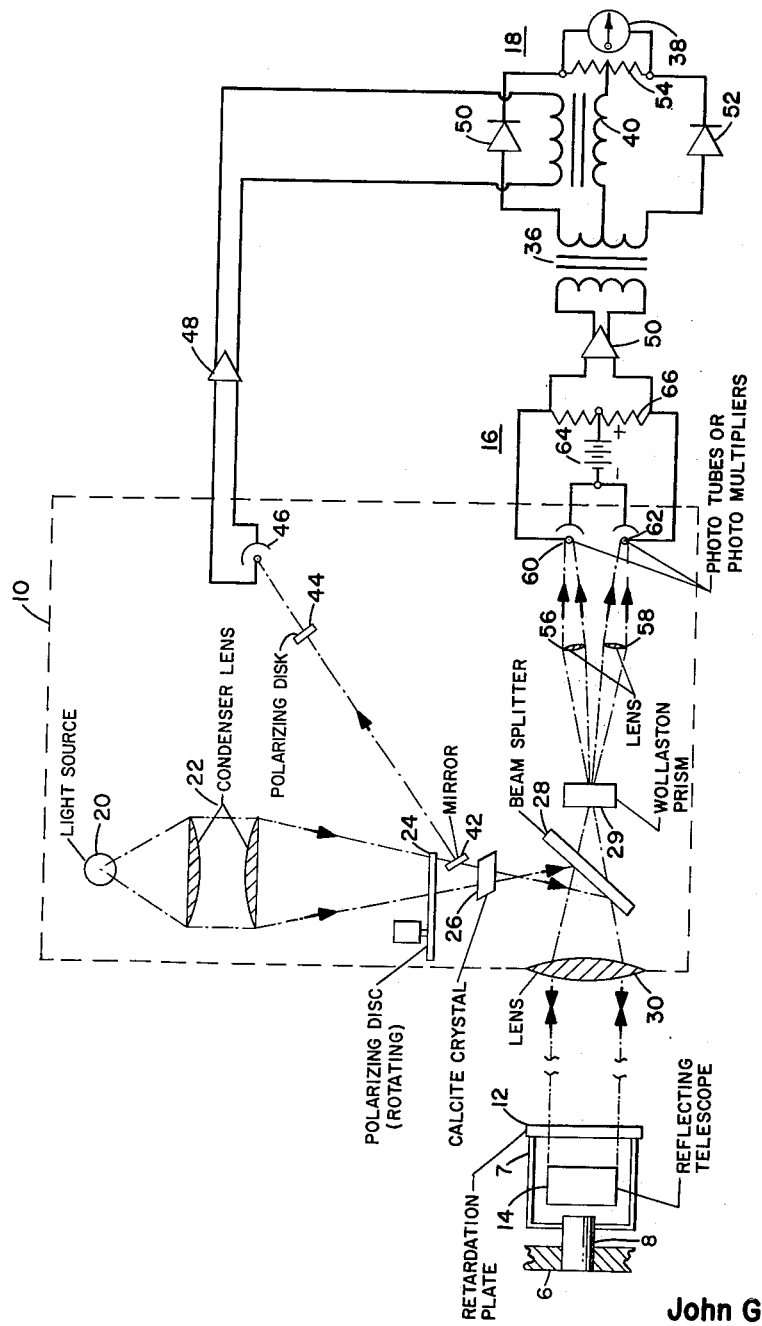
Figure 2:
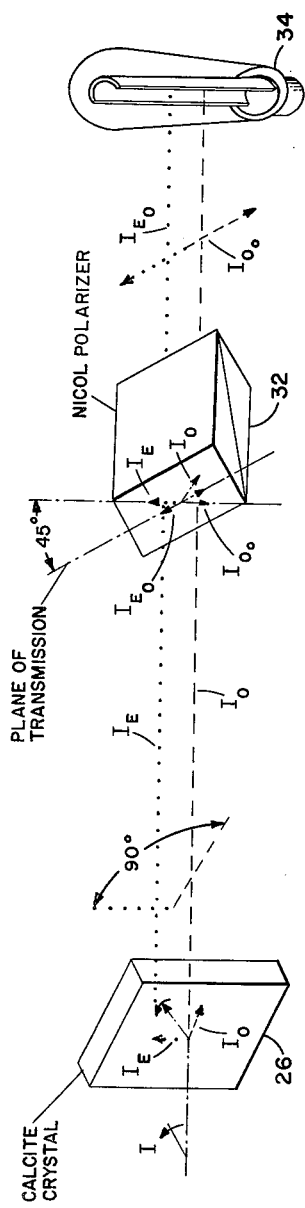
Figure 3:
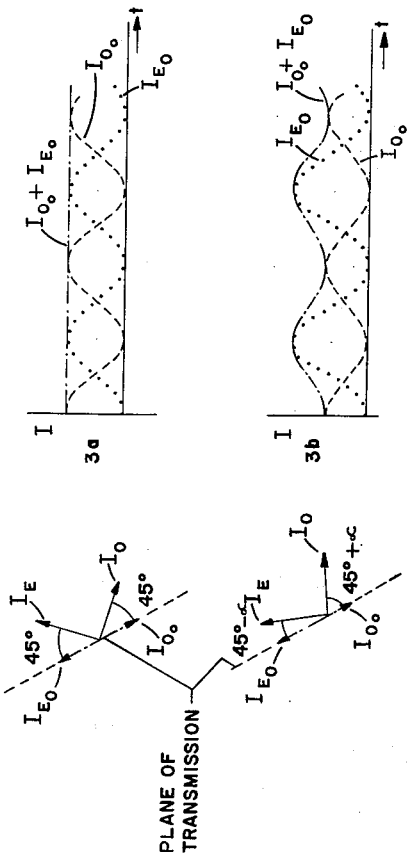
Figure 4:
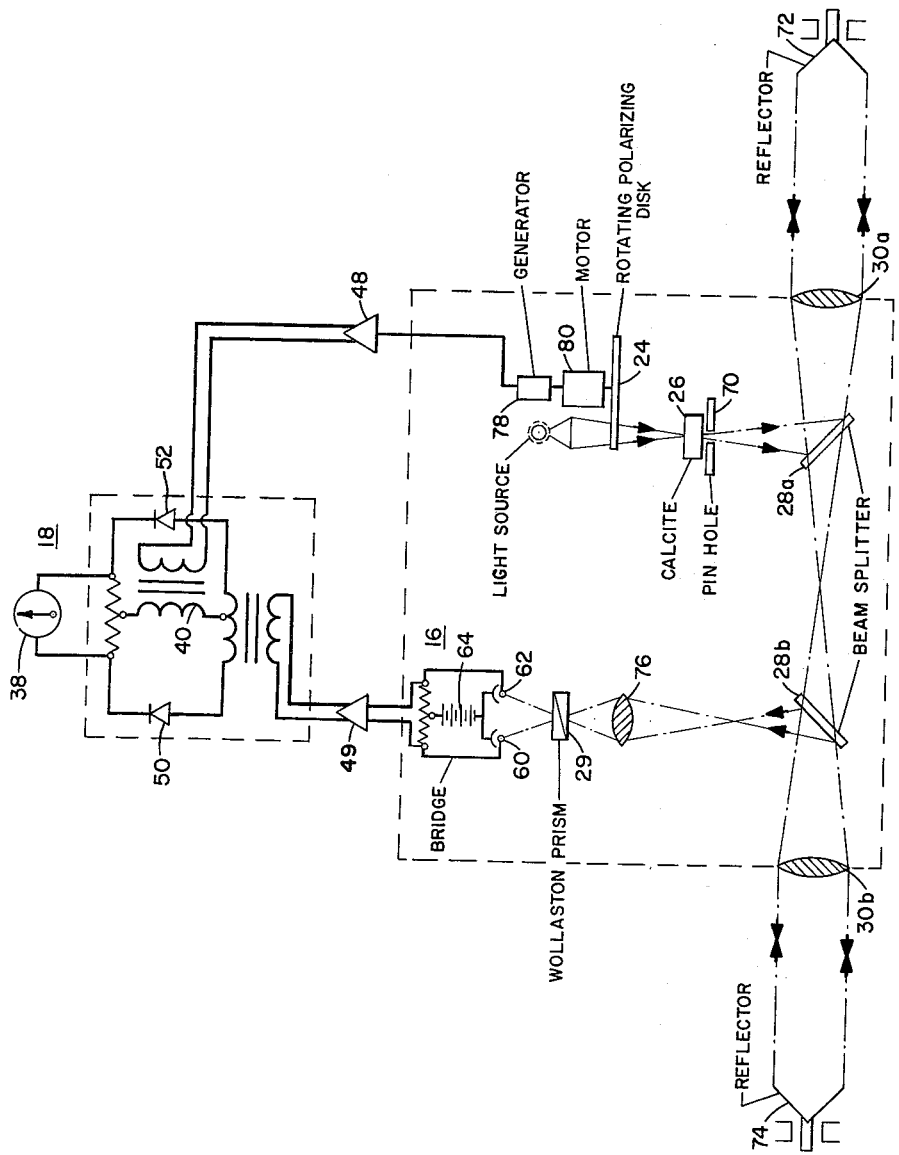

The specific nature of the invention, as well as other objects, uses, and advantages thereof, will clearly appear from the following description and from the accompanying drawing, in which:

FIGURES 1 and 4 are schematic diagrams illustrating embodiments of the invention; and FIGURES 2 and 3 are graphs illustrating the operation of the invention.

In accordance with the invention means are provided to generate a beam of plane polarized light and to rotate this plane. This rotating plane of light is projected through a device or composition, such as calcite or quartz, having the property of double refraction or birefringence. The output beam or ray consists of two non-rotating components, the ordinary ray and the extraordinary ray. The planes of polarization of the ordinary and extraordinary rays include an angle of 90°. Their amplitudes are displaced 180° in time.

Next, the output of the double refraction device is cast thru an optical system to an angular reference device (or devices) such as a corner reflector or retardation plate attached to the structure to be observed which, when rotated, rotates the planes of the incident rays. The retardation plate may be a thin sheet of mica or quartz cut parallel to the optical axis and of a thickness which will produce a total phase change of 180° between the light rays parallel to the optical axis and those disposed 90° therefrom. If the light beam rays to be shifted pass through the plate twice, as where it is used in conjunction with a mirror, then the thickness should be reduced to accomplish a 90° shift with each pass. After the beam of rays passes from the angular reference device it is cast thru a polarizing device on to one or more photosensitive cells. This polarizing device is oriented for reference alignment of the angular reference device when the plane of polarization of the polarizing device lies at 45° with respect to each of the polarized rays incident upon it. The electrical output of the cells is compared with a reference signal which is synchronized with the original rotating plane of light. The comparing device may be an untuned detector such as a synchronous rectifier. The relative orientation of all polarizing elements are arranged to provide a no-deviation output when the angular reference is positioned at the desired orientation. An indicator output of one phase indicates a deviation in a first direction and an indicator output of the opposite phase indicates a deviation in the opposite direction. Where it is desired to align two external structures, as opposed to aligning one structure with the central apparatus, the beam from the double refraction element circuits two angular reference devices, one attached to each of the structures, before being detected by the photo-sensitive cells.

Reference is now made to FIGURE 1 showing a first embodiment of an angular measuring system wherein the first measuring point is adjacent the reflecting telescope and the second measuring point is represented by the scanner. Broadly it consists of an optical scanning assembly designated as scanner 10, an optical angular reference apparatus consisting of retardation plate 12 and reflecting telescope 14, electrical bridge detector circuit 16 and phase comparator circuit 18. Scanner 10 comprises a light source 20 which by means of condenser lens 22 projects a light beam on rotating polarizing disk 24. The beam passing out of disk 24 consists of a rotating plane of polarized light which is projected thru calcite crystal 26. Crystal 26 changes the rotating plane of light into two non-rotating planes of light displaced at an angle of 90°. These planes of light are cast by means of beam splitter 28 (an example would be a half silvered mirror) and lens 30 on the retardation plate 12 attached to some structure 6 with respect to which an angular measurement is to be made. This structure 6 represents any fixed or movable external structure with which it is desired to align the scanner assembly. One end of a shaft 8 is rotatably mounted within the structure 6 while the other end of the shaft is fastened to a frame 7 which in turn is fastened to the retardation plate 12. The beam consisting of the two displaced polarized planes of light passes thru the retardation plate and is reflected back by reflecting telescope 14 thru the retardation plate, lens 30, beam splitter 28 to Wollaston prism 29 (a double image prism for splitting a light beam into two plane-polarized beams at right angles to each other).

For an explanation of what occurs at this point reference is made to FIGURE 2. As will be noted, a rotating beam is cast thru calcite crystal 26 to produce the 90° displaced planes referred to above and denoted $I_e$ and $I_o$. These planes of light are cast on Nicol polarizer 32 with its plane of polarization oriented at 45° with respect to the orientation of the light planes emitted by crystal 26. The amplitude variations of the planes of light are sinusoidal and differ by 180°. By this it is meant that the amplitude of the light in one plane is zero at a time when the light in the other plane is maximum. As is illustrated in FIGURE 3a the effect of polarizer 32 is to produce components of the original light planes in the polarizer plane. The components are obviously equal so long as the 45° relation exists, and, due to the 180° relation, they are complementary to produce a light output $I_{oo}+I_{eo}$ which is constant. Accordingly, the electrical output of phototube 34 would be a steady direct current. Referring back to FIGURE 1, assume that there is a rotation of retardation plate 12 and therefor a rotation of the polarization planes. This condition is illustrated in FIGURE 3b in which the 45° angle is varied by angle $\alpha$. The components now passed by polarizer 32 are unequal and thus produce not only a steady component of light output but also a sinusoidal light component corresponding to the phase of $I_e$, the predominant component. From FIGURE 3, it is clear that the greater the rotation of the light planes, the greater will be the variation in light output. By measuring this variation and calibrating it in terms of angular deviation an indication can be produced of angular deviation. Omitting at this point a description of the operation of detector circuit 16 and the difference between the operation of Wollaston prism 29 and Nicol polarizer 32, the light output of Wollaston prism 29 is received by detector circuit 16. The detector output signal is applied to comparator circuit 18 which consists of a synchronous rectifier and a direct current galvanometer 38. A reference signal is also applied to the synchronous rectifier through transformer 40. It is derived by means of mirror 42 reflecting a portion of the rotating plane of light thru polarizing disc 44 upon photocell 46. The reference signal thus derived is amplified by amplifier 48, and serves to open diode gates 50 and 52 during the half cycle poled to produce forward current flow thru these diodes. If retardation plate 12 is in alignment such that the plane of transmission of prism 29 occupies an angle of 45° with respect to each of the polarized rays incident upon it from the retardation plate, there is no variable light component in the rays received by photocells 60 and 62 of detector circuit 16, and thus no alternating current output from detector circuit 16 to comparator circuit 18. Without this output there will be no potential applied to galvanometer 38. This follows since the current flow thru potentiometer 54 due solely to the reference signal will be balanced, and provide no output voltage across the potentiometer output terminals. That is, the current thru the top half of the potentiometer, will be equal and opposite in direction to that thru the bottom half. If retardation plate 12 is rotated, and thus is no longer in alignment, an alternating current signal will be applied to transformer 36. This signal will either be in phase or 180° out of phase with the reference signal current thru diodes 50 and 52 and potentiometer 54 depending upon the direction which the retardation plate 12 has been rotated. As an indication of this direction the current thru potentiometer 54 will present to galvanometer 38 a positive potential for one direction and a negative potential for the other direction. As previously indicated the magnitude of the potential will indicate the magnitude of misalignment of the retardation plate 12 and, of course, the structure to which it is attached.

Considering now Wollaston prism 29 and detector circuit 16, the former is employed as a polarizer rather than the type illustrated by polarizer 32 in order to discriminate against stray light. Prism 29 accepts as does polarizer 32, only light polarized in one plane and as in the case of polarizer 32, the acceptance plane of prism 29 is positioned at 45° with respect to the reference incident planes of light. Its light output consists of two planes of polarized light as illustrated in FIGURES 2 and 3 for polarizer 32. The planes of these components are displaced 90° and the amplitude of the components differ in phase by 180°. These components are applied thru lens 56 and 58 to photocells 60 and 62 connected in a balance fashion in bridge detector circuit 16. Photocells 60 and 62 are biased by source 64 by means of a center bridge connection thru potentiometer 66. With this type of circuit complementary inputs will be reproduced between the extreme terminals of potentiometer 66 whereas identical inputs will be cancelled in potentiometer 66. Thus, stray light falling equally on photocells 60 and 62 will not be reproduced in the output. In addition to this advantage, the efficiency is doubled by the substitution of the Wollaston prism.

FIGURE 4 illustrates an embodiment of the invention arranged to measure the angular relation between two reference points, both of which are external to the scanner as opposed to the embodiment shown in FIGURE 1 in which one of the reference points is the scanner. Like components from FIGURE 1 bear the same numbers and operate in the same manner. The two perpendicular planes of light from calcite crystal 26 after passing thru pin hole aperture 70 (employed where desirable or necessary to reduce the beam) are reflected by beam splitter 28a, thru objective lens 30a to a first reference corner reflector 72. The beam is then reflected back thru objective lens 30a and beam splitter 28a thru beam splitter 28b and objective lens 30b to a second reference corner reflector 74. The beam is then reflected back thru objective lens 30b and reflected by beam splitter 28b up thru objective lens 76 to Wollaston prism 29 and then to photocells 60 and 62. It will be noted that instead of a mirror, polarizing disc and photocell for deriving a reference signal, a generator 78 is driven by motor 80 which drives rotating polarizing disc 24. This represents an alternate method for deriving a reference signal.

To examine the operation of the embodiment just described, assume initially that calcite element 26, the corner reflectors and Wollaston prism are aligned for zero or coincidence indication on galvanometer 38. Assume next that corner reflector 72 is oriented clockwise by a predetermined amount. This would produce a rotation of the two plane polarized rays so that they would not be the prescribed 45° with respect to the input plane of polarization of the Wollaston prism and as previously noted there would result a sinusoidal varying light on photocells 60 and 62, a corresponding electrical input passing thru amplifier 49 to comparator circuit 18 and an indication on galvanometer 38 of the rotation. This would represent an indication of a difference in angular orientation of corner reflectors 72 and 74. To return coincidence, reflectors 74 would have to be rotated counterclockwise by a like amount, and as this will return the polarization planes to their original orientation this will be indicated by a steady light output to phototubes 60 and 62 which will result in a galvanometer null, or no-deviation reading.

While the foregoing is a description of the preferred embodiment, the following claims are intended to include those modifications and variations that are within the spirit and scope of my invention.

I claim:
1. An angular measurement system comprising means for generating first and second planes of polarized light, said planes being displaced 90° and the intensity of said planes of light varying sinusoidally and differing by 180°, angular reference means receiving the output of said generating means for rotating said planes of light upon rotation of said angular reference means, light transmission means for accepting light polarized in one plane, said light transmission means being positioned to receive light from said angular reference means and being oriented with its plane of transmission 45° displaced from each of said first and second planes of polarized light, indicating means responsive to the output of said light transmission means and the output of said generating means for indicating the presence of sinusoidal variation in the output of said transmission means and the phase of such variation with respect to the phase of said output of said generating means.

2. The angular measurement system set forth in claim 1 wherein said means for generating comprises means for generating a rotating plane of polarized light and a double refraction means receiving said rotating plane of light for producing said planes of polarized light.

3. The angular measurement system set forth in claim 2 wherein said indicating means comprises a synchronous rectifier.

4. The angular measurement system set forth in claim 3 wherein said light transmission means comprises means for transmitting a light output in two perpendicular planes, the amplitudes of said planes of light being phase displaced 180°, said indicating means including a bridge photosensitive circuit means further including first and second photocells, connected in a balanced fashion, said first photocell being aligned to respond to a first of said planes of light transmission means and a second photocell being aligned to respond to the second of said planes of light from said light transmission means.

5. The angular measurement system set forth in claim 4 further comprising a second angular reference means positioned in a series relation with said first named angular reference means between said means for generating and said light transmission means.

6. The angular measurement system set forth in claim 4 wherein said angular reference means is a retardation plate of a thickness to produce a total phase shift of a half wave in the light passing through said plate.

7. The angular measurement system set forth in claim 6 wherein said angular reference means further comprises a mirror positioned to receive light which has passed in one direction through said retardation plate and reflect said light back through said plate, and the thickness of said plate corresponds to a quarter wave light phase shift.

8. The angular measurement system set forth in claim 7 wherein said mirror comprises a reflecting telescope.

9. The angular measurement system set forth in claim 4 wherein said angular reference means comprises a corner reflector.

References Cited in the file of this patent
UNITED STATES PATENTS

| | | |
|---|---|---|
| 2,167,484 | Berry | July 25, 1939 |
| 2,531,951 | Shamos et al. | Nov. 28, 1950 |
| 2,710,559 | Heitmuller et al. | June 14, 1955 |
| 2,861,493 | Landegren | Nov. 25, 1958 |
| 2,870,671 | Falconi | Jan. 27, 1959 |